United States Patent
Mandelbaum et al.

(10) Patent No.: US 12,311,604 B2
(45) Date of Patent: May 27, 2025

(54) SYSTEM FOR TRAY CLEANING AND RESIN COLLECTION IN AN ADDITIVE MANUFACTURING PROCESS

(71) Applicant: Stratasys, Inc., Eden Prairie, MN (US)

(72) Inventors: Dylan Mandelbaum, Eden Prairie, MN (US); John Paton, Eden Prairie, MN (US); Richard Juneyoung Jeong, Eden Prairie, MN (US); Brett Johnson, Eden Prairie, MN (US)

(73) Assignee: Stratasys, Inc., Eden Prairie, CA (US)

( * ) Notice: Subject to any disclaimer, the term of this patent is extended or adjusted under 35 U.S.C. 154(b) by 165 days.

(21) Appl. No.: 18/213,133

(22) Filed: Jun. 22, 2023

(65) Prior Publication Data
US 2024/0165880 A1    May 23, 2024

Related U.S. Application Data

(60) Provisional application No. 63/426,331, filed on Nov. 17, 2022, provisional application No. 63/442,678, filed on Feb. 1, 2023.

(51) Int. Cl.
*B67D 3/00*      (2006.01)
*B29C 64/357*    (2017.01)
*B33Y 40/20*     (2020.01)

(52) U.S. Cl.
CPC ............ *B29C 64/357* (2017.08); *B33Y 40/20* (2020.01)

(58) Field of Classification Search
CPC ...... B29C 64/357; B33Y 40/20; B67D 3/0029
USPC ................................................ 141/363–366
See application file for complete search history.

(56) References Cited

U.S. PATENT DOCUMENTS

| | | | | | |
|---|---|---|---|---|---|
| 5,586,692 | A | * | 12/1996 | Livengood | B67D 3/00 141/391 |
| 5,846,043 | A | * | 12/1998 | Spath | B62B 3/08 414/535 |
| 5,927,352 | A | * | 7/1999 | Wouters | B65B 69/0008 141/330 |
| 6,213,352 | B1 | * | 4/2001 | Boyer, Jr. | B65G 65/24 414/419 |
| 2004/0231749 | A1 | * | 11/2004 | Goldin | B67D 3/0087 141/319 |
| 2016/0362288 | A1 | * | 12/2016 | Stratton | B67D 3/0012 |

* cited by examiner

*Primary Examiner* — Paul J Gray
(74) *Attorney, Agent, or Firm* — Run8 Patent Group, LLC; Peter Miller; Leah Raddatz

(57) ABSTRACT

One variation of a system includes a chassis: defining a set of platform mounts defining a pivot axis; and a slot arranged between the set of platform mounts and configured to transiently retain a filter receptacle below the pivot axis. The system further includes a tray platform: pivotably coupled to the set of platform mounts; defining a tray-receiving section configured to receive a tray defining a fluid release point and configured to retain a volume of resin; and defining a set of supports arranged about the tray-receiving section and configured to locate the fluid release point at the fixed pivot location. The system further includes a tray lock coupled to the platform and configured to transiently generate a magnetic field to draw the tray against the tray-receiving section and cooperate with the set of tray supports to constrain the fluid release point to the fixed pivot location.

20 Claims, 5 Drawing Sheets

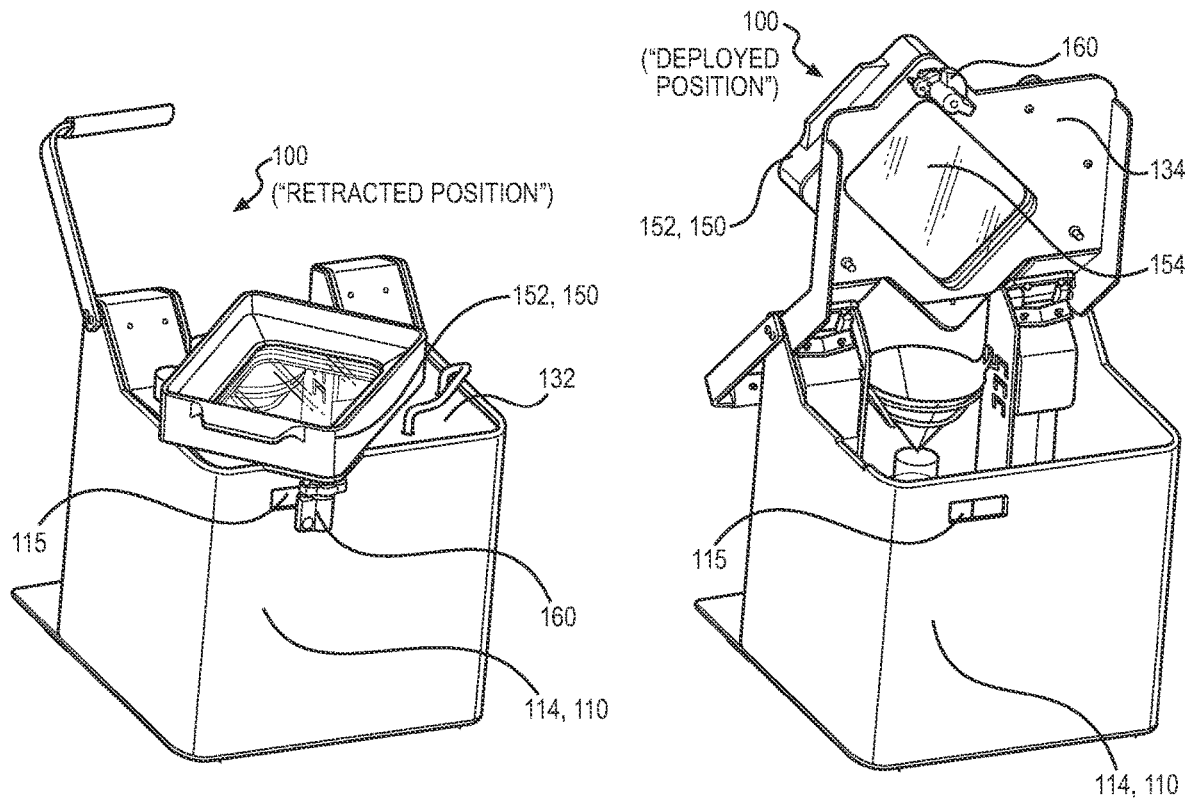
*FIGURE 3A*
*FIGURE 3B*
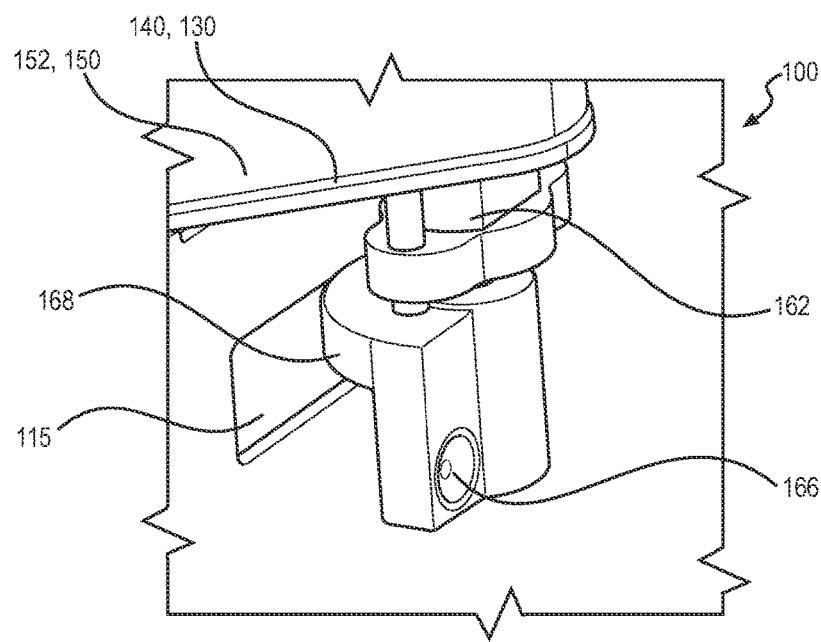
*FIGURE 3C*

SYSTEM FOR TRAY CLEANING AND RESIN COLLECTION IN AN ADDITIVE MANUFACTURING PROCESS

CROSS-REFERENCE TO RELATED APPLICATIONS

This Application claims the benefit of U.S. Provisional Application No. 63/442,678, filed on 1 Feb. 2023, and U.S. Provisional Application No. 63/426,331, filed on 17 Nov. 2022, each of which is incorporated in its entirety by this reference.

TECHNICAL FIELD

This invention relates generally to the field of additive manufacturing and more specifically to a new and useful system for resin reclamation in the field of additive manufacturing.

BRIEF DESCRIPTION OF THE FIGURES

FIGS. 3A, 3B, and 3C are schematic representations of the system;

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1A:
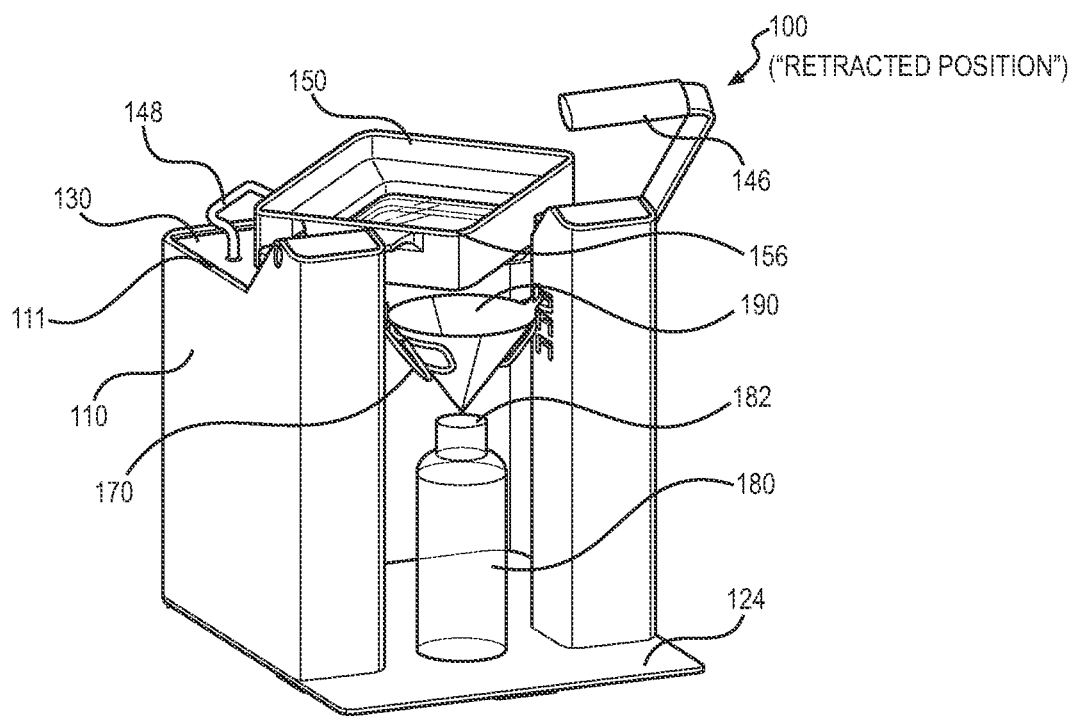
FIGS. 1A and 1B are schematic representations of a system.
Figure 1B:
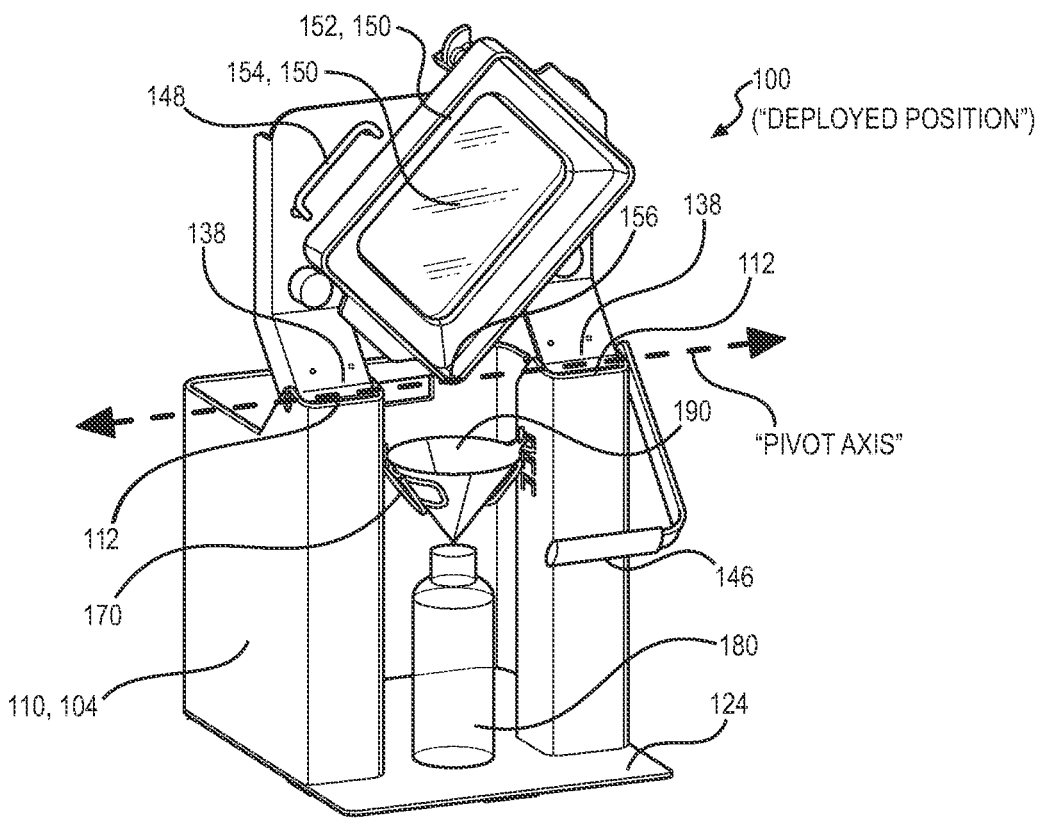
Figure 2A:
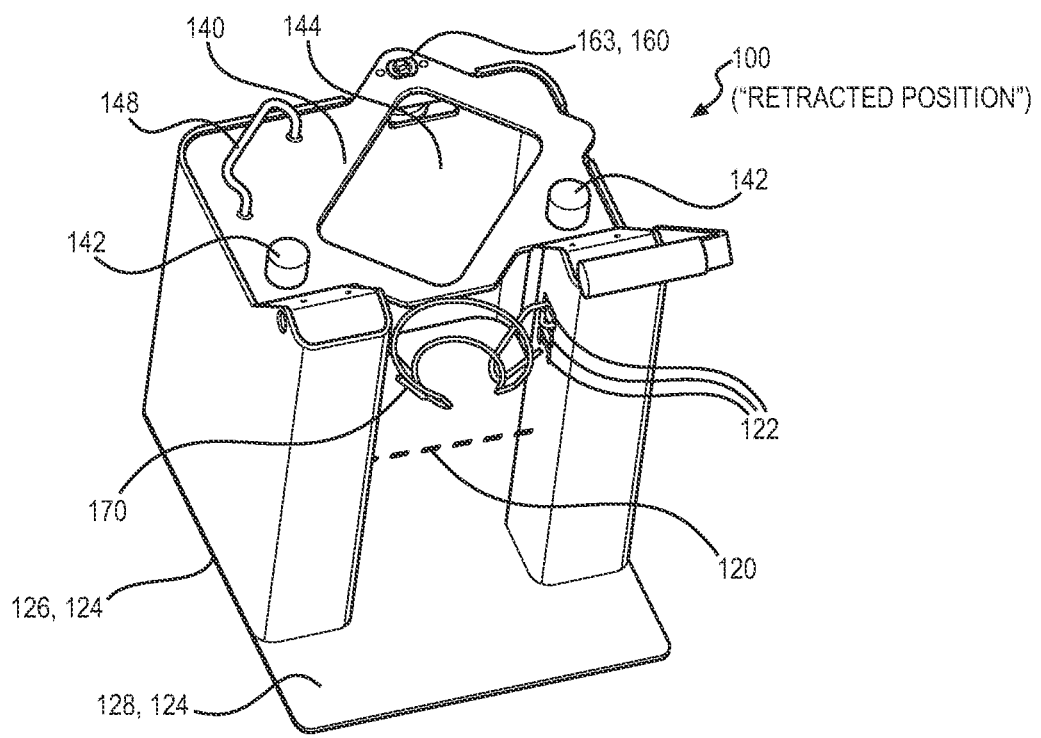
FIGS. 2A and 2B are schematic representations of the system.
Figure 2B:
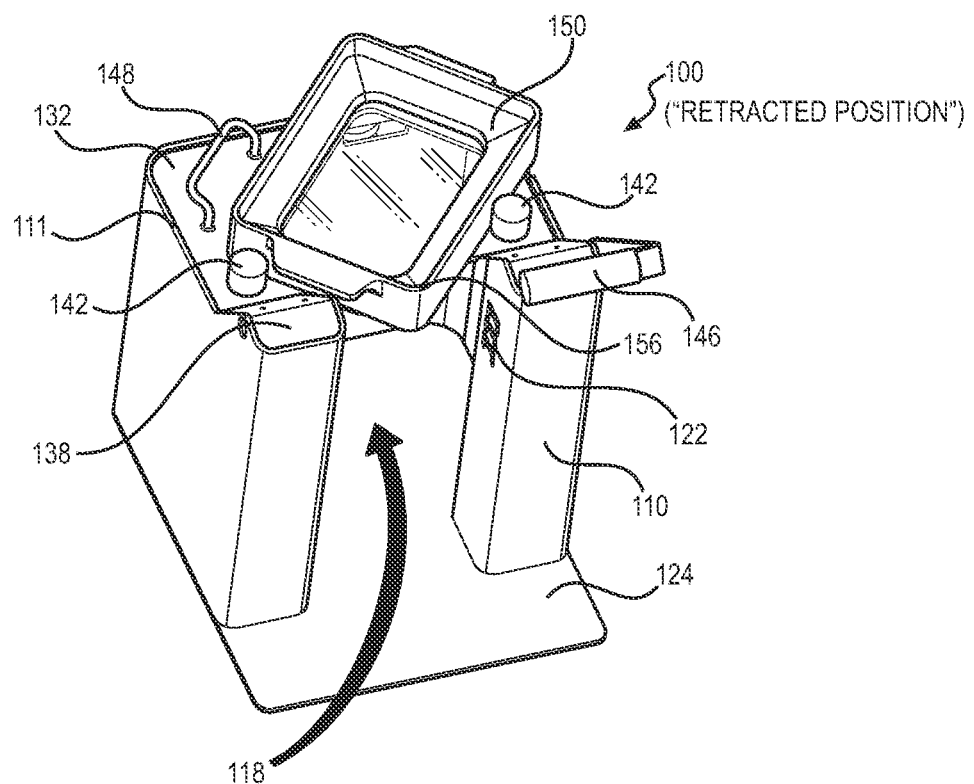
Figure 4A:
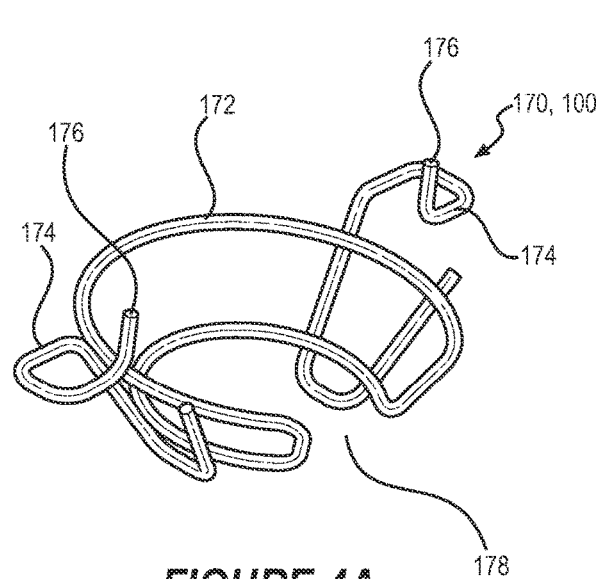
FIGS. 4A, 4B, and 4C are schematic representations of the system.
Figure 4B:
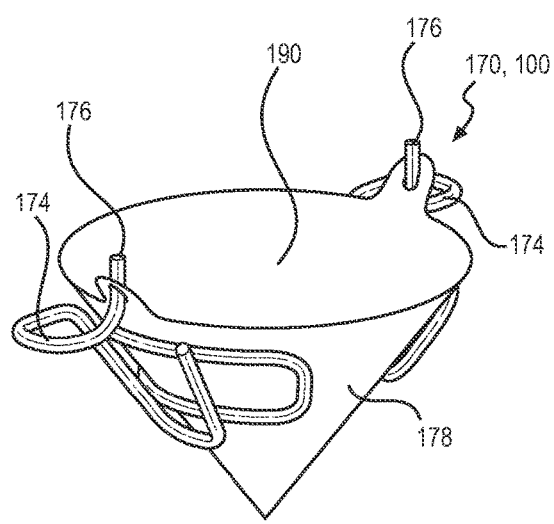
Figure 4C:
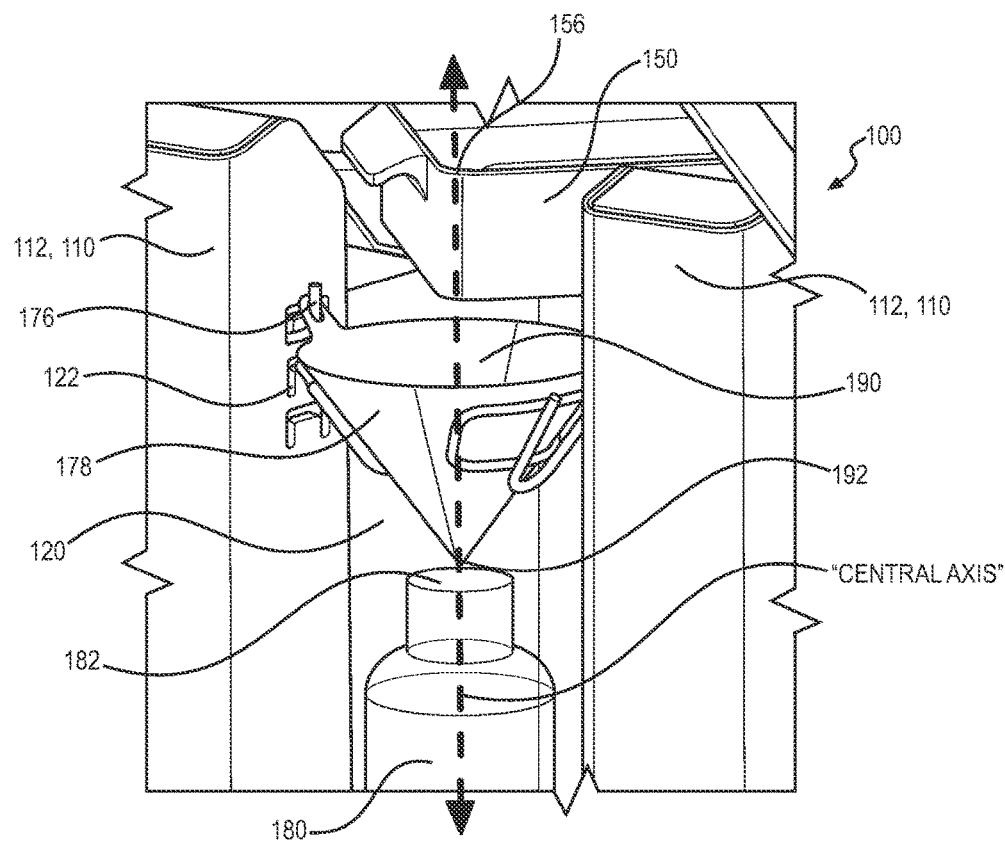
Figure 5A:
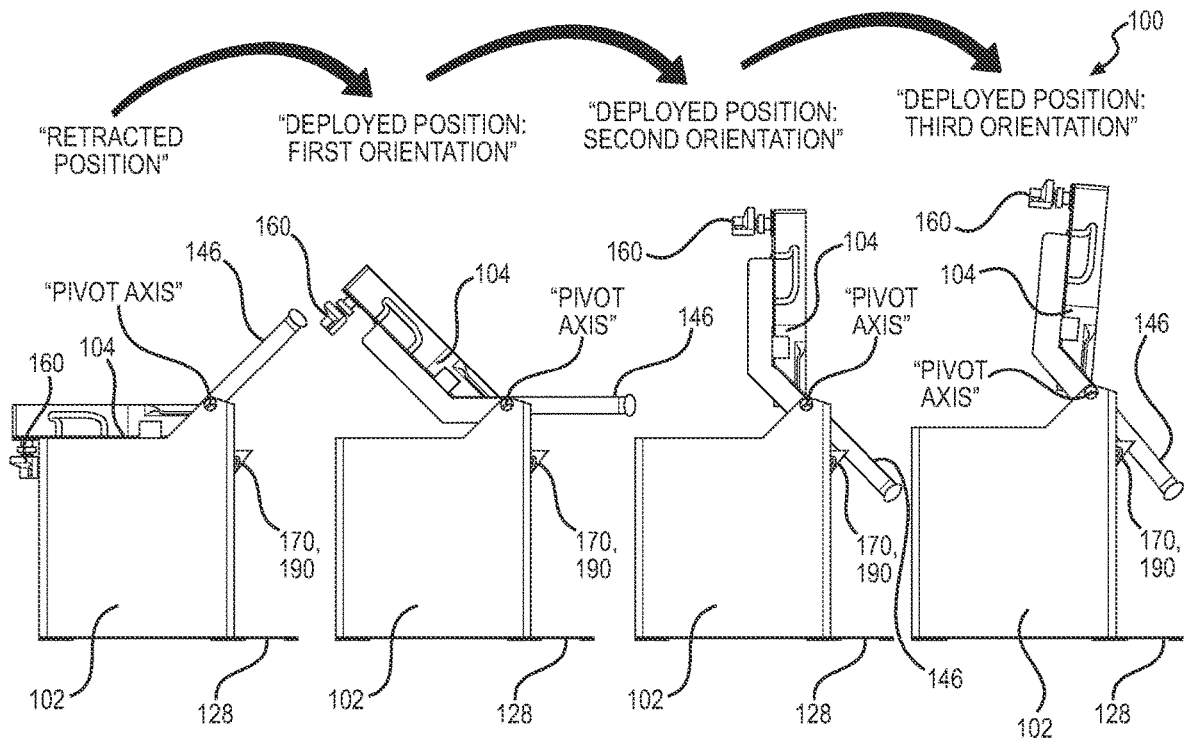
FIGS. 5A and 5B are schematic representations of the system.
Figure 5B:
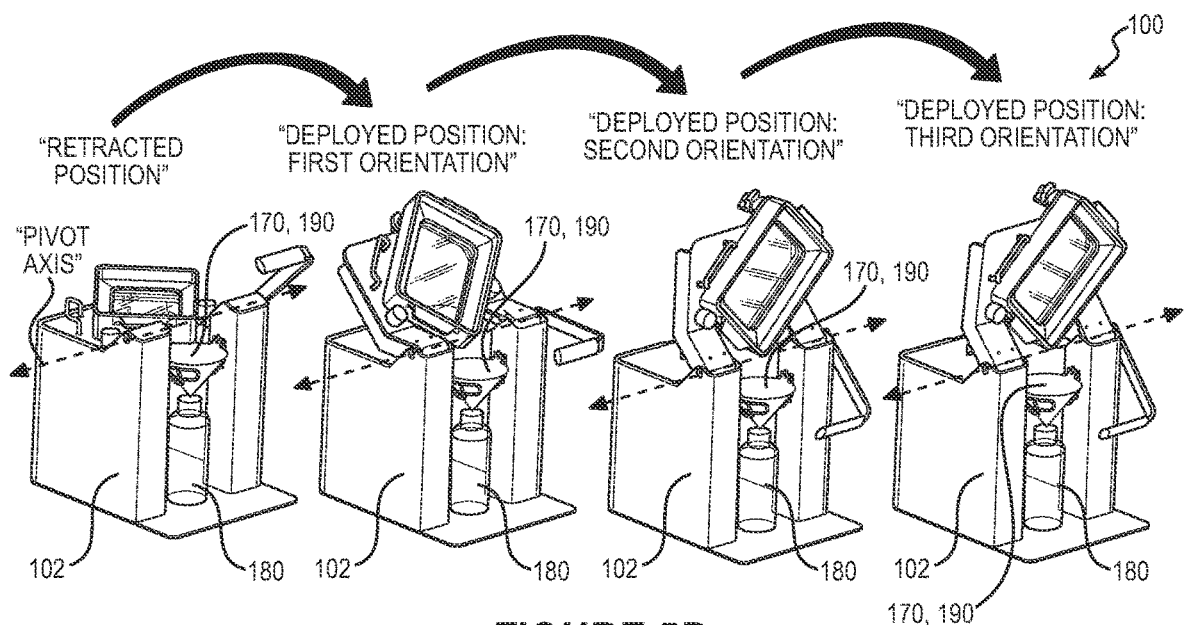

As shown in FIGS. 1A, 1B, 2A, 2B, 3A-3C, 4A-4C, 5A, and 5B, a tray cleaning system 100 (hereinafter "the system 100") includes a chassis 102; a filter receptacle 170; and an upper assembly 104.

The chassis 102: defines an inner cavity 118 and an upper rim 111 arranged about the inner cavity 118; includes a set of platform mounts 116 arranged coaxially at the upper rim 111 and defining a pivot axis defining a fixed pivot location arranged between the set of platform mounts 116; and defines a slot 120 arranged between the set of platform mounts 116, extending below the fixed pivot location, contiguous the inner cavity 118, and including a set of retention features 122.

The filter receptacle 170: is configured to transiently mate with the set of retention features 122 to seat below the fixed pivot location within the slot 120; defines a central axis orthogonal the pivot axis; and is configured to receive and retain a resin filter 190 configured to filter and release resin into a collection vessel 180 transiently arranged below the filter receptacle 170 within the slot 120.

The upper assembly 104 is flexibly coupled to the chassis 102 and includes: a platform 130; a tray 150; a tray lock 160; and a handle 146.

The platform 130: is pivotably coupled to the chassis 102 at the set of platform mounts 116; defines a tray-receiving section 140 and a set of tray positioners 142 arranged about the tray-receiving section 140; and is configured to transiently mate with the upper rim 111 in a retracted position and deploy outward from the upper rim 11, away from the inner cavity 118, into a range of orientations in a deployed position.

The tray 150 defines a fluid release point 156 and is configured to: transiently seat on the tray-receiving section 140 and cooperate with the set of tray 150 supports to locate the fluid release point 156 at the fixed pivot location; receive and retain a volume of resin within an interior volume of the tray 150 in the retracted position; and direct fluid from the interior volume of the tray 150 toward the fluid release point 156 for release from the tray 150, at the fluid release point 156, toward the resin filter 190 in the deployed position.

The tray lock 160 is coupled to a lower surface 134 of the platform 130, opposite the tray-receiving section 140, and configured to: magnetically draw the tray 150 against the tray-receiving section 140; and cooperate with the set of tray positioners 142 to constrain the fluid release point 156 at the fixed pivot location across the range of orientations.

The handle 146 is coupled to the platform 130 and configured: to pivot the platform about the pivot axis; to pivot the tray 150 about the fluid release point 156; and release resin from the tray 150 at the fluid release point 156 toward the filter, responsive to application of a force on the handle 146.

One variation of the system 100 includes the chassis 102: defining an upper rim 111 and a recess 115 arranged below the upper rim 111; including a set of platform mounts 116 arranged coaxially at the upper rim 111 and defining a pivot axis defining a fixed pivot location arranged between the set of platform mounts 116; and defining a slot 120 arranged between the set of platform mounts 116, extending below the fixed pivot location, and configured to transiently receive and retain a filter receptacle 170 within the slot 120 below the fixed pivot location.

In the preceding variation, the system 100 further includes the upper assembly 104 flexibly coupled to the chassis 102 and including: the platform 130; the handle 146; and the tray lock 160. The platform 130: is pivotably coupled to the chassis 102 at the set of platform mounts 116; defines a tray-receiving section 140 configured to transiently receive a tray 150 configured to retain a volume of resin and defining a fluid release point 156; defines a set of tray positioners 142 arranged about the tray-receiving section 140 and configured to locate the fluid release point 156 at the fixed pivot location; and is configured to transiently mate with the upper rim 111 in a retracted position and deploy outward from the upper rim 111 (e.g., away from the inner cavity 118), to locate the tray 150 in a range of orientations and direct resin from within an interior volume of the tray 150 toward the fluid release point 156 for releasing into the filter 190, in a deployed position. The handle 150 is coupled to the platform 130 and configured to pivot the platform 130 about the pivot axis responsive to rotation. The tray lock 160 is coupled to the platform below the tray-receiving section 140 and includes: a lock body 162 defining an inner surface 163 and including a set of magnetic features 164 operable in an engaged position and a disengaged position; and a lock control 166 coupled to the lock body 162, defining a boss 168 configured to transiently seat within the recess 115 to constrain rotation of the platform 130 in the retracted position. In this variation, the lock control 166 is configured to: drive the set of magnetic features 164 into the engaged position to constrain the tray 150 against the platform 130 and draw the boss 168 outward from the recess 115 responsive to rotation in a first direction; and drive the set of magnetic features 164 into the disengaged position to release the tray 150 from the platform 130 and locate the boss 168 within the recess 115 to fix the orientation of the upper assembly 104 in the retracted position responsive to rotation in a second direction opposite the first direction.

One variation of the system 100 includes a chassis 102: defining an upper rim 111 and a recess 115 arranged below the upper rim 111; including a set of platform mounts 116 arranged coaxially at the upper rim 111 and defining a pivot axis defining a fixed pivot location arranged between the set of platform mounts 116; and defining a slot 120 arranged between the set of platform mounts 116, extending below the fixed pivot location, and configured to transiently receive and retain a filter receptacle 170 within the slot 120 below the fixed pivot location.

In the preceding variation, the upper assembly 104 is flexibly coupled to the chassis 102 and includes a platform: pivotably coupled to the chassis 102 at the set of platform mounts 116; defining a tray-receiving section 140 configured to transiently receive a tray 150 configured to retain a volume of resin and defining a fluid release point 156; defining a set of tray positioners 142 arranged about the tray-receiving section 140 and configured to locate the fluid release point 156 at the fixed pivot location; and configured to transiently mate with the upper rim 111 in a retracted position and deploy outward from the upper rim 111 111 away from the inner cavity 118, to locate the tray 150 in a range of orientations and direct resin from within an interior volume of the tray 150 toward the fluid release point 156 for releasing into the filter, in a deployed position. The upper assembly 104 further includes: a handle 146 coupled to the platform 130 and configured to pivot the platform 130 about the pivot axis responsive to rotation; and a tray lock 160 coupled to the platform 130 below the tray-receiving section 140. The tray lock 160 includes: a lock body 162 defining an inner surface 162 and comprising a set of magnetic features 164 operable in an engaged position and a disengaged position; and a lock control 166 coupled to the lock body 162 and defining a boss 168 section configured to transiently seat within the recess 115 to constrain rotation of the platform 130 in the retracted position. The lock control 166 is configured to: drive the set of magnetic features 164 into the engaged position to constrain the tray 150 against the platform 130 and draw the boss 168 section outward from the recess 115 responsive to rotation in a first direction; and drive the set of magnetic features 164 into the disengaged position to release the tray 150 from the platform 130 and locate the boss 168 within the recess 115 to fix the orientation of the upper assembly 104 in the retracted position responsive to rotation in a second direction opposite the first direction.

2. Applications

Generally, the system 100 includes: a chassis 102—configured to mount the system 100 to a base surface—defining a set of platform mounts 116, arranged coaxial and defining a pivot axis, and a slot 120 extending downward from the pivot axis between the set of platform mounts 116; a filter receptacle 170—configured to receive and retain a resin filter 190—transiently arranged within the slot 120 below the pivot axis; a tray platform 130—pivotably coupled to the set of platform mounts 116—configured to transiently receive a resin tray 150 on a surface of the tray platform 130 and kinematically locate and retain a fluid release point 156 (e.g., a spout) of the tray 150 in a fixed pivot location coaxial the pivot axis and vertically above the filter receptacle 170 within the slot 120; and a handle 146 configured to enable a user to rapidly pivot the tray platform 130, about the pivot axis, from a retracted position (e.g., approximately at horizontal) to a deployed position—defining a range of tray orientations (e.g., between 0-degrees from horizontal and 100-degrees from horizontal)—to release or pour resin from the tray 150 at the fluid release point 156 and into the filter arranged in the filter receptacle 170 for filtering and collection of filtered resin in a collection vessel 180 arranged below the filter receptacle 170.

In particular, by locating the fluid release point 156 of the tray 150 at the fixed pivot location on the pivot axis—such that rotation of the tray platform 130 about the pivot axis pivots the tray 150 about the pivot axis at the fluid release point 156—the tray 150 can exhibit a fixed fluid release point 156 and therefore define a fixed fluid pathway of resin released from the tray 150. The chassis 102, the tray platform 130, and the tray 150 can therefore cooperate to define a fixed fluid pathway extending from the fixed pivot location on the pivot axis toward the filter arranged in the filter receptacle 170. In one implementation, the tray platform 130 can include a set of tray positioners 142 configured to cooperate with a tray lock 160 to kinematically support the tray 150 on the tray platform 130 and rigidly locate the fluid release point 156 at the fixed pivot location, such as in the retracted and deployed positions and/or during rotation of the tray platform 130.

Thus, by fixing the fluid release point 156 of the tray 150 and the resulting fluid pathway, the system 100 can be configured to: precisely locate the filter receptacle 170 within the slot 120 below the tray 150—such that a central axis (e.g., a vertical axis) defined by the filter receptacle 170 falls within a threshold distance of the fluid release point 156—thereby increasing an amount of resin collected and reducing resin waste; minimize a size or footprint of the filter receptacle 170 required for collecting resin released from the tray 150—such as due to limited variations in the fixed fluid pathway—and therefore minimize a size of the slot 120 and/or the chassis 102; and minimize resin spills—such as during pouring of resin from the tray 150 into the filter receptacle 170—and resin residue on surfaces of the system 100 thereby reducing resources dedicated to cleaning surfaces of the tray 150, tray platform 130, chassis 102, and/or filter receptacle 170.

Additionally, the system 100 can be configured to enable rapid user access to interior surfaces of the chassis 102 and/or surfaces of the tray 150 and tray platform 130 for rapid cleaning. In particular, in one implementation, in preparation for cleaning, a user may remove the filter receptacle 170 from the slot 120 to access an inner cavity 118 (e.g., an empty, hollow cavity) of the chassis 102 arranged below the tray platform 130 in the retracted position. The user may then wipe down surfaces of the inner cavity 118 to remove any resin present and a bottom surface of the tray platform 130 facing the inner cavity 118 in the retracted position. The chassis 102 can therefore be configured to enable rapid cleaning of surfaces of the system 100—such as in preparation for loading a tray 150 containing a different resin type—and therefore limit contamination and/or mixing of different resins or resin types.

Further, in one implementation, the tray platform 130 can include a window 144 configured to enable cleaning of a bottom surface of the tray 150 (e.g., including a membrane film 154). The user may therefore reach through the slot 120 and into the inner cavity 118 of the chassis 102, to wipe down surfaces of the tray 150 exposed via the window 144, such as without requiring the user to remove or lift the tray 150 from the tray platform 130 for cleaning.

Additionally, the system 100 can include a tray lock 160—coupled to the tray platform 130—configured to cooperate with the set of tray positioners 142 on the tray platform 130 to kinematically constrain the tray 150 on the tray-receiving section 140 of the tray platform 130. In particular, the tray lock 160 can include: a magnetic lock configured to magnetically retain the tray 150 against a surface of the tray platform 130 to constrain movement of the tray 150 on the tray platform 130; and a control (hereinafter "lock control 166")—such as a knob or a switch actuatable and accessible by an operator—configured to transiently activate and deactivate the magnetic lock responsive to actuation by the operator. In addition, the tray lock 160 can further include a mechanical boss 168 configured to transiently engage a recess 115 of the chassis 102 to constrain rotation of the tray platform 130 out of the retracted position when the magnetic lock is deactivated. A user may therefore: rotate the lock control 166 in a first direction to activate the magnetic lock and draw the mechanical boss 168 out from the recess 115 to lock the tray 150 to the tray platform 130 and enable rotation of the tray platform 130; and rotate the lock control 166 in a second direction—opposite the first direction—to deactivate the magnetic lock and insert the mechanical boss 168 into the recess 115 to unlock the tray 150 from the tray platform 130 and constrain rotation of the tray platform 130 relative the chassis 102. The tray lock 160 can therefore be configured to limit resin spills—and resources dedicated to cleaning resin spills—by only enabling rotation of the tray platform 130 when the tray 150 is secured or locked to the tray platform 130.

3. Chassis

The system 100 includes a chassis 102 configured to: support the upper assembly 104 in both the retracted and deployed positions; accept and retain the filter receptacle 170—transiently loaded with a filter—below the fluid release point 156 for collection of resin in the filter; and accept and retain a collection vessel 180 below the filter receptacle 170 for collection of filtered resin released from the filter.

In one implementation, the chassis 102 includes: a chassis base 124 configured to mount the chassis 102 to a surface (e.g., a ground surface), forming a bottom surface or "floor" of the chassis 102; a chassis body 110 seated over the chassis base 124, thus forming "walls" of the chassis 102; an inner cavity 118—bounded by the chassis base 124 and the chassis body 110—configured to seat below the tray platform 130 in the retracted position; and a slot 120 (e.g., a cutout, an inlet, a doorway)—contiguous the inner cavity 118—arranged in the chassis body 110 and configured to transiently house the filter receptacle 170 and the collection vessel 180. For example, the chassis 102 can include: a substantially flat base surface configured to mount the chassis 102 to a surface (e.g., the ground, a flat support structure); and an approximately U-shaped chassis body 110—mounted to the base surface—forming walls of the chassis 102 extending upward from the base surface.

Additionally, in one implementation, the chassis 102 can be machined from sheet metal to form a hollow structure configured to support the upper assembly. For example, the chassis 102 can include: a base 124 formed of a section of flat sheet metal (e.g., aluminum); and a body 110 formed of a section of folded sheet metal (e.g., aluminum), such as a singular cut of sheet metal folded to form a set of chassis 102 walls defining the inner cavity 118. In this example, the chassis 102 can be machined such that the section of folded sheet metal—forming the body 110 (or "chassis 102 walls")—is rigidly attached to the section of flat sheet metal forming the base 124.

Further, by arranging the inner cavity 118 (e.g., a hollow cavity) below the tray platform 130 and/or the tray 150 in the retracted position, the chassis 102 can be configured to enable a user to access (e.g., via the slot 120 to the inner cavity 118) surfaces of the tray platform 130 and/or the tray 150 in addition to surfaces below the tray platform 130 for cleaning, such as without removing the tray 150 and/or lifting the tray platform 130.

3.1 Chassis Base

The chassis 102 includes a chassis base 124 (hereinafter a "base" 124) configured to: mount the chassis 102 to a surface; and receive and support the collection vessel 180 below the filter receptacle 170. Further, the base 124 can be configured to support the upper assembly 104 across the range of deployed positions.

In particular, in one implementation, the base 124 can define a base section 126 and an extended section 128 extending from the base section 126. In this implementation, the base 124 section can: define a base footprint approximating a footprint of a cross-section of the chassis body 110, such that the chassis body 110 can be rigidly mounted about an edge or perimeter of the base section 126; and therefore be configured to seat directly below the tray platform 130 and the tray 150 in the retracted position. The extended section 128 extends outward from the base section 126—on a front side of the chassis 102 including the slot 120—such that the extended section 128 seats vertically below a portion of the tray 150 in a fully-deployed position (e.g., 95-degrees from horizontal). The extended section 128 can therefore be configured to support a weight of the tray 150 when deployed beyond 90-degrees from the seated position (i.e., 90-degrees from horizontal).

3.2 Chassis Body

The chassis 102 includes a chassis body 110 (hereinafter a "body") mounted to the base 124. Generally, the body 110 defines: an outer surface and an inner surface—opposite the outer surface—forming the inner cavity 118 of the chassis 102; a lower rim—defining a lower perimeter of the chassis 102—rigidly fixed to the base 124; and an upper rim 111—defining an upper perimeter of the chassis 102—configured to transiently mate with the tray platform 130 in the retracted position.

In one implementation, the body 110 defines an inner cavity and a slot 120—extending through the body 110 (e.g., from the outer surface to the inner surface) to the inner cavity 118—configured to transiently receive and retain the filter receptacle 170. In particular, the slot 120 can be arranged directly below the fixed pivot location defined for the fluid release point 156 of the tray 150, such that the filter receptacle 170 can install within the slot 120 below the fixed pivot location and the fluid release point 156 of the tray 150. In this implementation, the slot 120 can therefore include a set of retention features 122 configured to mate with corresponding features of the filter receptacle 170 to transiently locate the filter receptacle 170 within the slot 120. Additionally, in another implementation, the body 100 can define a recess 115 arranged on the outer surface of the body and configured to transiently receive a boss 168 of the tray lock 160.

3.2.1 Seat Section+Mounting Sections

In one implementation, the body 110 can define a seat section 114 and a set of mounting sections 112 extending from the seat section 114. In particular, in this implementation, the body 100 can define: the seat section 114 (e.g., an approximately U-shaped seat section) mounted over the base section 126 and configured to transiently receive the tray platform 130 in the retracted position; and the set of mounting sections 112—extending from the seat section 114 and arranged coplanar between the base section 126 and the extended section 128 of the base 124—defining a set of platform mounts 116 arranged coaxially and defining a pivot axis.

For example, the body 110 can define a seat section 114 defining: a first side wall; a rear wall extending (e.g., orthogonally) from the first side wall; and a second side wall—parallel and opposite the first side wall—extending from the rear wall. In this example, the body 110 can further define: a first mounting section 112 extending from the first side wall, opposite the rear wall, and defining a first platform mount 116 arranged at the upper rim 111 parallel the base 124; and a second mounting section 112 extending from the second side wall, opposite the rear wall and toward the first mounting section 112, and defining a second platform mount 116 arranged at the upper rim 111 parallel the base 124, such that the first and second platform mounts 116 are arranged coaxially across the first and second platform mounts 116 and cooperate to define the pivot axis. In this example, the body 110 can define the slot 120: extending vertically through the body 110; and arranged between the first mounting section 112 and the second mounting section 112, such that the first and second mountings sections 112 cooperate with the slot 120 to define the front "wall" of the body 110 opposite the rear wall.

3.2.2 Platform Mounts

The set of platform mounts 116 can be configured to interface with a set of mounting features of the tray platform 130 to pivotably couple the tray platform 130 to the body 110 at the pivot axis, such that the tray platform 130 can transiently rotate about the pivot axis.

In one implementation, the upper rim 111 of the body 110 can be configured to exhibit a noncongruent height corresponding to a noncongruent height of the tray platform 130. In particular, in this implementation, the seat section 114 can be configured to define a seat height less than a mount height of the set of mounting sections 112 including the set of platform mounts 116 arranged coaxially at a fixed pivot height (e.g., approximating the mount height). The set of platform mounts 116 can therefore cooperate to define a pivot axis—such as extending horizontally at or proximal the upper rim 111 of the set of mounting sections 112—arranged at the fixed pivot height (e.g., approximating the mount height) exceeding the seat height of the seat section 114.

In this implementation, the body 110 can further include a set of sloping sections extending at an angle downward (e.g., in the retracted position) from the set of platform mounts 116 at the fixed pivot height to the seat section 114 at the seat height. In this implementation, by locating the set of platform mounts 116—defining the pivot axis—at a vertical height above the seat section 114, the chassis 102 and the tray platform 130 can cooperate to: seat the base surface of the tray 150 on the tray platform 130 at the seat height in the retracted position; and locate the fluid release point 156 of the tray 150 at the fixed pivot height—coaxial the pivot axis—in the retracted position. Therefore, the upper rim 111 of the chassis 102 can be configured to exhibit a height difference between the set of platform mounts 116 and the seat section 114 approximating (e.g., within one percent, within five percent) the tray height of the tray 150.

4. Upper Assembly

The system 100 includes an upper assembly 104—including the tray platform 130 and the tray 150—flexibly coupled to the chassis 102. In one implementation, the upper assembly 104 can include: the tray platform 130 pivotably coupled to the set of platform mounts 116—defining the pivot axis—arranged on the upper rim 111 of the chassis 102; and the tray 150—configured to retain a volume of resin—seated on the tray platform 130; a tray lock 160 coupled to the tray platform 130 and configured to transiently lock the tray 150 to the tray platform 130; and a handle 146 (e.g., operable by a user) coupled to the set of platform mounts 116 and configured to drive the tray platform 130 about the pivot axis—across a range of tray orientations—responsive to application of a force on the handle 146 (e.g., by a user).

In particular, the upper assembly 104 is configured to pivot about the pivot axis between a retracted position—in which the tray platform 130 mates with the upper rim 111 of the chassis 102—and a deployed position in which the tray platform 130 seats above the upper rim 111 of the chassis 102. The upper assembly 104 can be rotated from the retracted position to the deployed position—defining a range of tray orientations (e.g., between 0 degrees and 100 degrees) relative the chassis 102—to locate the tray 150 in a particular orientation relative the chassis 102.

4.1 Resin Tray

The system 100 can include a resin tray 150 (hereinafter "tray 150") defining an interior volume configured to receive and retain a volume of resin. In particular, the tray 150 can include: a tray body 152 defining a base surface, a set of tray walls (e.g., four walls) arranged about the base surface and defining a tray rim, and an aperture arranged in (e.g., extending through) the base surface; and a membrane film 154 spanning the aperture. The tray 150 can further define a fluid release point 156 arranged on the tray rim, such as arranged on a corner of the tray rim between adjacent tray walls. In the retracted position, the tray body 152 and the membrane film 154 can therefore cooperate to retain liquid resin within the interior volume of the tray 150. In the deployed position, the tray 150 can be configured to direct fluid (e.g., in resin) from within the interior volume of the tray 150 toward the fluid release point 156 (e.g., via gravity) for release into a filter arranged within the filter receptacle 170 installed below the fluid release point 156 within the slot 120.

For example, the tray 150 can include a rectangular body defining: a base surface configured to seat against the tray-receiving section 140 of the tray platform 130; a set of four walls defining a tray rim and a set of four corners; and a fluid release point 156—such as defining a spout or curved surface configured to promote fluid flow from the fluid release point 156—arranged on the tray rim at a first corner in the set of four corners. In this example, the tray platform 130 can therefore be configured to: receive the tray 150 in the retracted position; and pivot about the pivot axis to locate the tray 150 in the deployed position—defining a range of tray orientations (or "tray angles") relative the chassis 102—to promote fluid flow from the interior volume of the tray 150 toward the fluid release point 156 and into the filter below the fluid release point 156.

4.2 Tray Platform

The system 100 includes a tray platform 130 pivotably coupled to the chassis 102 and configured to receive and retain the tray 150. In particular, in one implementation, the tray platform 130 can be pivotably coupled to the set of platform mounts 116—at the pivot axis—proximal the upper rim 111 of the chassis 102. Generally, the tray platform 130 is configured to: transiently mate with the upper rim 111 of the chassis 102 in the retracted position; and pivot about the pivot axis to seat above the upper rim 111 in the deployed position.

In one implementation, the tray platform 130 can define: a lower surface 134 facing the inner cavity 118 in the retracted position; an upper surface 132 opposite the lower surface 134; and a tray-receiving section 140 arranged on the upper surface 132 and configured to transiently receive the tray 150 and locate the fluid release point 156 in the fixed pivot location along the pivot axis. The tray platform 130 can further include a set of tray positioners 142 configured to locate the tray 150 on the tray-receiving section 140 and constrain the fluid release point 156 to the fixed pivot location, such as during deployment of the upper assembly 104 from the retracted position and across the range of tray orientations.

4.2.1 Base Platform+Hinge Sections

In one implementation, the tray platform 130 can include a base platform 136 and a set of hinge sections 138 extending from the base platform 136.

In particular, in this implementation, the tray platform 130 can define: a base platform 136—defining the tray-receiving section 140 and including the set of tray positioners 142 arranged about the tray-receiving section 140—configured to transiently mate with the upper rim 111 of the chassis 102 in the retracted position; and a set of hinge sections 138 extending from the base platform 136 and pivotably coupled to the set of platform mounts 116 of the chassis 102, such that each hinge section 138, in the set of hinge sections 138, is pivotably coupled to a corresponding platform mount 116 in the set of platform mounts 116. For example, the chassis 102 can include: a first platform mount 116 arranged at the upper rim 111—on a first mounting section 112 of the chassis 10—on a first side of the slot 120; and a second platform mount 116 arranged at the upper rim 11—on a first mounting section 112 of the chassis 102—coaxial the first platform mount 116 and on a second side of the slot 120 opposite the first side. In this example, the tray platform 130 can include: a base platform 136 configured to seat approximately flush the upper rim 111 of the chassis 102 in the retracted position; a first hinge section 138 extending from a first end of a front side of the base platform 136 and pivotably mounted to the first platform mount 116; and a second hinge section 138 extending from a second end of the front side of the base platform 136 and pivotably mounted to the second platform mount 116, such that the slot 120 extends vertically between the first and second hinge section 138.

Additionally, in the preceding implementation, the base platform 136 and the set of hinge sections 138 can be configured to cooperate to locate the fluid release point 156 of the tray 150 at the fixed pivot location along the pivot axis. In this implementation, the tray-receiving section 140 can further define a cutout 141 arranged within the slot 120, between the set of hinge sections 138, and below a section (e.g., a corner) of the tray 150 including the fluid release point 156. For example, in the preceding example, the tray platform 130 can define a cutout 141 between the first platform mount 116 and the second platform mount 116. The tray platform 130 can therefore receive the tray 150 on the tray-receiving section 140 to seat this section of the tray 150—including the fluid release point 156—above the cutout 141, within the slot 120, and directly above the filter receptacle 170, such that resin released at the fluid release point 156 flows directly into the filter 190 with minimal or no obstruction.

Additionally, in the preceding implementation, the base platform 136 can be configured to define a platform height—such as in the retracted position—less than a hinge height defined by the set of hinge sections 138, such that the set of hinge sections 138 seat above the base platform 136 by a fixed height corresponding to a height difference between the seat section 114 and the set of mounting sections 112 of the chassis 102. The tray platform 130 can therefore be configured to: receive a bottom surface of the tray on the tray-receiving section of the base platform 150 at the platform height; and locate the fluid release point 156 of the tray 150—arranged on the rim of the tray 150—at approximately (e.g., within 1 percent, within 5 percent) the hinge height, above the platform height, on the pivot axis.

4.2.1.1 Friction Hinges

In one implementation, the set of hinge sections 138 of the tray platform 130 can define a set of friction hinges (or "torque hinges") configured to restrict rotation of the upper assembly 104 relative the chassis 102.

In particular, in this implementation, the set of friction hinges can define a static friction force. In order to rotate the upper assembly 104, a user may apply a force to the set of friction hinges to overcome static friction force. For example, the set of friction hinges can be configured to apply a static force (e.g., a static torque) between the upper assembly 104 and the chassis 102 to restrict rotation of the upper assembly 104 relative the chassis 102. The user may exert a force on the handle 146—rigidly coupled to the tray platform 130—to overcome the static force of the set of friction hinges between the upper assembly 104 and the chassis 102 and therefore rotate the upper assembly 104 to a first deployed position defining a first angle (e.g., 45 degrees) relative the chassis 102. The user may then release the handle 146—thereby removing the force on the handle 146—to maintain the upper assembly 104 in the first deployed position while resin is drained from the tray 150, such that the static friction force exerted by the set of friction hinges constrains rotation of the upper assembly 104 away from the first deployed position.

In the preceding example, the set of friction hinges can therefore be configured to exert a static force (e.g., torque) exceeding a dynamic torque applied to the upper assembly 104 (e.g., due to gravity) across the range of tray orientations (e.g., between 0 degrees and 95 degrees from horizontal) in the deployed position. To rotate the upper assembly 104, the user may therefore apply a force on the handle 146 to exert a torque on the upper assembly 104 exceeding this static friction force.

4.2.2 Tray Positioners

The tray platform 130 can include a set of tray positioners 142 configured to locate the tray 150 on the tray-receiving section 140 of the tray platform 130.

In one implementation, the set of tray positioners 142 can be configured to: locate and retain the tray 150 within the tray-receiving section 140 in a particular orientation in order to locate the fluid release point 156 of the tray 150 at the fixed pivot location on the pivot axis; and kinematically support the tray 150 during rotation of the upper assembly 104 to constrain the tray 150 on the tray-receiving section 140 and constrain movement of the fluid release point 156 from the fixed pivot location.

Additionally, in this implementation, the set of tray positioners 142 can be configured to cooperate with the tray lock 160 to kinematically support the tray 150 and constrain the fluid release point 156 at the fixed pivot location. For example, the tray platform 130 can include: a set of fixed positioners arranged on the upper surface 132 of the tray platform 130 and configured to transiently mate with side walls of the tray 150; and the tray lock 160 arranged on the tray platform 130 and configured to transiently draw the tray 150 toward the tray platform 130. In particular, in one example, the tray platform 130 can include: a first fixed positioner 142 arranged on the upper surface 132 of the tray platform 130, on a first side of the tray-receiving section 140—adjacent the pivot axis—and configured to transiently mate with a first side (e.g., a first wall) of the tray 150 seated on the tray-receiving section 140 of the tray platform 130; a second fixed positioner 142 arranged on the upper surface 132 of the tray platform 130, on a second side of the tray-receiving section 140—adjacent the pivot axis and bordering the first side—and configured to transiently mate with a second side (e.g., a second wall) of the tray 150 seated on the tray-receiving section 140 of the tray platform 130; and the tray lock 160 arranged on the lower surface 134 of the tray platform 130—below the tray-receiving section 140—configured to seat below a corner section of the tray 150, opposite the first and second sides of the tray 150, to fix the corner section of the tray 150 to the tray-receiving section 140. The first fixed positioner, the second fixed positioner, and the tray lock 160 can therefore cooperate to constrain the tray 150 at 3 distinct sections or points of the tray 150, and thereby cooperate to kinematically constrain movement of the tray 150 on the tray-receiving section 140.

Additionally, in one implementation, the set of tray positioners 142 can include a coating—such as an elastomeric coating—applied to surfaces of the tray positioners 142 and contacting surfaces of the tray 150. The coating can be configured to limit movement of the tray 150 relative the set of tray positioners 142.

4.2.3 Variation: Platform Window

In one variation, the tray-receiving section 140 can define a window 144 configured to enable user access to the membrane film 154 of the tray 150 without removing the tray 150 from the tray platform 130, such as for cleaning between print periods. In particular, in this variation, the tray platform 130 can include the tray-receiving section 140 defining: an outer seat configured to receive and support the tray 150; and a window 144—surrounded by (e.g., inset) the outer seat—configured to seat below the membrane film 154. The window 144 can be configured to exhibit a size (e.g., area, dimension) corresponding to a size of the membrane film 154, such that a user may access the membrane film 154—with the tray 150 and the tray platform 130 in the retracted position—via the slot 120 and window 144, such as for cleaning between print periods.

4.2.4 Tray Geometry: Fixed Tray Height

In one implementation, the tray platform 130 can be configured to receive and locate trays 150 of variable sizes on the tray-receiving section 140.

In particular, in this implementation, the tray platform 130 can be configured to: receive a tray 150 of the fixed tray height on the tray-receiving section 140; and locate the fluid release point 156 of the tray 150—arranged on the tray rim—at the fixed pivot position on the pivot axis. In this implementation, the tray 150 can define: a base surface configured to seat against the tray-receiving section 140 of the tray platform 130; and a tray rim defining the fluid release point 156 and exhibiting the fixed tray height from the base surface. The tray 150 can be configured to exhibit the fixed tray height—defined by a distance (e.g., perpendicular distance) between the base surface and the tray rim—corresponding to a distance (e.g., perpendicular distance) between the tray-receiving section 140 and the pivot axis. The tray platform 130 can therefore be configured to receive a set of trays 150 of various shapes (e.g., rectangular, square) and/or sizes (e.g., area, volume, dimensions)—each tray 150, in the set of trays 150, exhibiting the fixed tray height—and locate the fluid release point 156 of each tray 150 at the fixed pivot position, along the pivot axis, regardless of shape, size, and/or other dimensions (e.g., width, length) of the tray 150.

For example, the system 100 can include a set of trays 150 including: a first tray 150 defining a first width, a first length, and the fixed tray height; and a second tray 150 defining a second width, a second length, and the fixed tray height. In this example, the tray platform 130 can define the tray-receiving section 140 configured to: receive the first tray 150 during a first time period; and receive the second tray 150—in replacement of the first tray 150—during a second time period distinct from the first time period. The tray platform 130 can include a set of tray positioners 142—such as including a set of bumpers and/or the tray lock 160—configured to: kinematically support the first tray 150 and constrain a first fluid release point 156—arranged on a first rim of the first tray 150 at the fixed tray height from the tray platform 130—to the fixed pivot position along the pivot axis during the first time period; and kinematically support the second tray 150 and constrain a second fluid release point 156—arranged on a second rim of the second tray 150 at the fixed tray height from the tray platform 130—to the fixed pivot position along the pivot axis during the second time period.

Therefore, by configuring each tray 150, in the set of trays 150, to exhibit the fixed tray height, the tray platform 130 can be configured to maintain the fluid release point 156 at the fixed pivot position regardless of variability in tray geometry.

4.2.5 Tray Geometry: Variable Tray Height

In one variation, the tray platform 130 can be configured to receive and locate trays 150 of variable tray heights on the tray-receiving section 140. In this variation, the tray platform 130 can include a tray 150 seat configured to seat on the tray-receiving section 140—below the tray 150—to increase a height of the tray rim relative the tray platform 130 in order to locate the fluid release point 156 at the fixed pivot position along the pivot axis.

In particular, in this variation, the tray platform 130 can be configured to receive and locate a tray 150 seat on the tray-receiving section 140. The tray 150 seat can then receive a tray 150—defining a tray height less than the fixed tray height—on the tray 150 seat. The tray 150 seat can be configured to exhibit a seat height approximating a difference between the fixed tray height and the tray height, such that the tray platform 130 and the tray 150 seat cooperate to locate the tray rim and fluid release point 156 of the tray 150 at the fixed tray height and in the fixed pivot position.

Further, in this variation, the system 100 can include a set of tray 150 seats of varying heights in order to accommodate trays 150 of varying tray heights. For example, during a first time period, the tray platform 130 can be configured to receive: a first tray 150 seat—defining a first seat height—on the tray-receiving section 140; and a first tray 150—defining a first tray height—on the first tray 150 seat, a sum of the first seat height and the first tray height approximating the fixed tray height. During a second time period, the tray platform 130 can be configured to receive: a second tray 150 seat—defining a second seat height exceeding the first seat height—on the tray-receiving section 140 during a second time period; and a second tray 150—defining a second tray height less than the first tray height—on the second tray 150 seat during the second time period, a sum of the second seat height and the second tray height approximating the fixed tray height. Further, in the preceding example, during a third time period, the tray platform 130 can be configured to receive a third tray 150—defining a third tray height approximating (e.g., within 1 percent, within 5 percent) the fixed tray height—directly on the tray-receiving section 140, such as absent a tray 150 seat.

4.3 Tray Lock

The upper assembly 104 includes a tray lock 160 coupled to the tray platform 130 and configured to transiently fix the tray 150 to the tray-receiving section 140 of the tray platform 130. In particular, the tray lock 160 can be configured to cooperate with the set of tray positioners 142 on the tray platform 130 to kinematically constrain the tray 150 on the tray-receiving section 140 of the tray platform 130.

In one implementation, the tray lock 160 is configured to magnetically draw the tray 150 against the tray-receiving section 140. In this implementation, the tray lock 160 can be arranged below a portion of the tray-receiving section 140 opposite the tray 150. The tray lock 160 can include a lock body 162: defining an inner surface facing the tray-receiving section 140 (e.g., opposite the tray 150); and including a set of magnetic features 164 arranged within the lock body 162 and operable in an engaged position and a disengaged position. The tray lock 160 can further include a lock control 166—such as a knob or a switch actuatable and/or accessible by an operator—coupled to the lock body 162 and configured to drive the set of magnetic features 164 into the engaged position responsive to rotation in a first direction (e.g., by an operator) and configured to drive the set of magnetic features 164 into the disengaged position responsive to rotation in a second direction opposite the first direction.

In particular, in this implementation, the set of magnetic features 164 can be configured to: transiently generate a magnetic field to draw the tray 150 toward the inner surface and against the tray-receiving section 140 in the engaged position; and withhold generation of the magnetic field in the disengaged position. In this implementation, the tray 150 can be formed of a ferrous or magnetic material and/or include a set of magnetic elements arranged within the tray 150.

The lock control 166 can therefore be configured to: drive the set of magnetic features 164 into the engaged position to generate the magnetic field and draw the bottom surface of the tray 150 against the inner surface of the lock body 162—and therefore clamp the portion of the tray-receiving section 140 between the bottom surface of the tray 150 and the inner surface—to constrain the tray 150 against the tray platform 130 responsive to rotation in the first direction; and drive the set of magnetic features 164 into the disengaged position to release the tray 150 from the tray platform 130—and thereby enable removal of the tray 150 from the tray platform 130—responsive to rotation in the second direction.

For example, the tray lock 160 can include: a fixed magnetic element (e.g., a fixed magnet, a fixed magnetic plate) arranged within the lock body 162; and a rotatable magnetic element (e.g., a rotatable magnet, a rotatable magnetic plate) rotatably coupled to the fixed magnetic element. In particular, the rotatable magnetic element can be configured to transiently rotate between the disengaged position—in which the fixed magnetic element and the rotatable magnetic element are arranged "out-of-phase" (e.g., at 180 degrees) and the engaged position in which the fixed magnetic element and the rotatable magnetic element are arranged "in-phase" (e.g., at 0 degrees) and cooperate to generate the magnetic field. In this example, the lock control 166 can therefore be configured to rotate the rotatable magnetic element between the engaged and disengaged positions responsive to actuation of the lock control 166 by an operator.

An operator may therefore: locate the tray 150 on the tray-receiving section 140 of the tray platform 130 in preparation for cleaning of the tray 150 and collection of resin released from the tray 150; actuate (e.g., rotate) the lock control 166 in a first direction to activate the magnetic field and fix the tray 150 to the tray-receiving section 140; apply a force to the handle 146 to rotate the upper assembly 104 about the chassis 102, such as to a first deployed position defining a first tray orientation; release the handle 146—with the upper assembly 104 in the first deployed position—to enable release and collection of resin contained in the tray 150; apply a force on the handle 146 to rotate the upper assembly 104 about the chassis 102 to the retracted position; actuate the lock control 166 in a second direction—opposite the first direction—to deactivate the magnetic field and unfix the tray 150 from the tray-receiving section 140 of the tray platform 130; and lift the tray 150 off of the tray platform 130.

4.3.1 Variation: Locking Boss

In one variation, the tray lock 160 can include a locking boss 168 configured to transiently engage a recess 115 of the chassis 102 to mechanically constrain rotation of the upper assembly 104 relative the chassis 102 and thus fix the upper assembly 104 in the retracted position.

In particular, in this variation, the chassis 102 can define a recess 115 arranged on an outer wall of the chassis 102 proximal the tray lock 160. The lock control 166 of the tray lock 160 can define a locking boss 168—such as a projection, a latch, or a hook—configured to seat within the recess 115 to constrain rotation of the upper assembly 104 in the retracted position. Therefore, the lock control 166 can be configured to: drive the set of magnetic features 164 into the engaged position to constrain the tray 150 against the tray platform 130 and draw the boss 168 section outward from the recess 115 to unfix rotation of the upper assembly 104 about the chassis 102 responsive to rotation in a first direction; and drive the set of magnetic features 164 into the disengaged position to release the tray 150 from the tray platform 130 and locate the boss 168 within the recess 115 to fix rotation of the upper assembly 104—located in the retracted position—responsive to rotation in a second direction opposite the first direction.

The locking boss 168 can therefore be configured to prevent rotation of the upper assembly 104—out of the retracted position—when the set of magnetic elements occupy the disengaged position, thereby preventing resin spills or equipment damage due to dislodging of the tray 150 from the tray 150 surface during rotation.

4.4 Handle

The system 100 can include a handle 146 coupled to the tray platform 130 and configured to pivot the tray platform 130 about the pivot axis responsive to rotation (e.g., by a user). In one implementation, the handle 146 can be rigidly coupled to the tray platform 130 at a hinge section 138. In particular, in this implementation, the handle 146 can define an: an arm rigidly coupled to the hinge section 138 at the pivot axis and extending outward, away from the tray platform 130, coplanar the hinge section 138; and a stem—coupled to the arm opposite the hinge section 138—parallel and offset the pivot axis. For example, a user may: apply a force downward on the stem to rotate the platform 130 about the pivot axis—in a first direction away from the inner cavity 118—and into the deployed position; and apply a force upward on the stem to rotate the platform 130 about the pivot axis—in a second direction, opposite the first direction, toward the inner cavity 118—and into the retracted position.

In one variation, the upper assembly 104 can include a secondary handle 148 arranged on the upper surface 132 of the tray platform 130. For example, the upper assembly 104 can include: the handle 146 mounted to a first hinge section 138 of the tray platform 130 at the pivot axis; and a secondary handle 148 arranged on a side of the tray-receiving section 140—opposite the first hinge section 138—on the tray platform 130. In this example, the user may leverage the handle 146 and/or the secondary handle 148 to rotate the tray platform 130 about the pivot axis. The secondary handle 148 can therefore be configured to further enable the user to rotate the tray platform 130.

5. Filter Receptacle

The system 100 can include a filter receptacle 170 transiently arranged within the slot 120 of the chassis 102 and configured to receive and locate a resin filter 190 (hereinafter a "filter") (e.g., a 190-micron filter) within the slot 120 for collection and/or filtration of resin released from the tray 150. In particular, the filter receptacle 170 can be configured to transiently engage the set of retention features 122 of the chassis 102 to locate and retain the filter receptacle 170 within the slot 120.

The filter receptacle 170 can define: a center bore; and a central axis (e.g., approximately parallel walls of the slot 120 and/or chassis 102)—such as orthogonal the pivot axis defined by the set of platform mounts 116—extending through the center bore. The filter receptacle 170 can receive and locate a filter within the filter receptacle 170 approximately coaxial (e.g., within one percent, within two percent, within ten percent) the central axis, such that an outlet 192 (e.g., a tip or apex) of the filter is approximately coaxial the central axis. The filter receptacle 170 can therefore be configured to define a form factor corresponding to (e.g., matched, approximating) a form factor of the filter.

In one implementation, the filter receptacle 170 can define a conical geometry configured to receive a conical filter. For example, the filter receptacle 170 can include: an upper section defining a first circumference; and a lower section arranged below the upper section—opposite the tray platform 130 in the retracted position—and defining a second circumference less than the first circumference.

5.1 Filter Receptacle: Installation and Removal

The filter receptacle 170 can be configured to mate with the set of retention features 122 of the chassis 102 to transiently install within the slot 120. In one implementation, the filter receptacle 170 can include: a receptacle body configured to receive the filter; and a set of inserts 174 extending outward from the receptacle body and configured to transiently engage the set of retention features 122 to locate and retain the filter receptacle 170 (e.g., above the collection vessel 180) within the slot 120. A user may therefore: couple the set of inserts 174 with set of retention features 122 to rigidly locate the filter receptacle 170 within the slot 120; and/or decouple the set of inserts 174 from the set of retention features 122 to remove the filter receptacle 170 from the slot 120 and access the inner cavity 118 via the slot 120, with minimal obstruction.

Additionally and/or alternatively, in one implementation, the filter receptacle 170 can define a gap 178 configured to enable removal of a filter from the filter receptacle 170, such as without removing the filter receptacle 170 from the slot 120 of the chassis 102. In particular, in this implementation, the filter receptacle 170 can define a gap 178: arranged on a side of the filter receptacle 170 facing away from the inner cavity 118; and configured to fit a portion of the filter through the gap 178. The gap 178 can therefore enable removal of the filter from the filter receptacle 170 without requiring an increase in vertical clearance between the upper section or top portion of the filter receptacle 170 and the bottom surface of the tray 150 in the retracted position. For example, an operator may: partially lift the filter upward, toward the tray 150, in order to unseat the filter from the upper and lower rims of the filter receptacle 170; align a lower section of the conical filter—exhibiting a reduced diameter from the upper section of the conical filter—with the gap 178; and pull the filter outward through the gap 178 for removal and/or replacement with a new filter.

Therefore, by including this gap 178, the filter receptacle 170 can be configured to: limit lifting of the filter over surfaces of the filter receptacle 170 during removal, thereby minimizing an amount of cleaning required for surfaces of the filter receptacle 170 and/or other surfaces of the system 100, such as due to spilling or dripping of resin from the filter and onto the filter receptacle 170; and minimize vertical clearance required for removal of the filter from the filter receptacle 170, thereby enabling a reduction in size (e.g., height) of the chassis 102, in space required for installation of the system 100, and in amount and/or costs of material required for the chassis 102 and filter receptacle 170.

5.2 Filter Receptacle: Variable Height

Additionally, in one implementation, the filter receptacle 170 can be configured to install within the slot 120 in a range of vertical positions, each vertical position defining a particular height from the base 124 of the chassis 102.

In particular, in this implementation, the chassis 102 can include: a first subset of retention features 122, in the set of retention features 122, arranged at a first height within the slot 120; and a second set of retention features 122, in the set of retention features 122, arranged at a second height within the slot 120, the second height exceeding the first height. The filter receptacle 170 can include the set of inserts 174 configured to: transiently engage the first subset of retention features 122 to locate the filter receptacle 170 in a first position—corresponding to the first height—within the slot 120; and transiently engage the second subset of retention features 122 to locate the filter receptacle 170 in a second position—corresponding to the second height—above the first position within the slot 120. The chassis 102 can similarly include additional subsets of retention features 122 arranged at different heights—such as including a third subset of retention features 122, in the set of retention features 122, arranged at a third height within the slot 120, a fourth subset of retention features 122, in the set of retention features 122, arranged at a fourth height within the slot 120, etc.—configured to transiently mate with the set of inserts 174 to locate the filter receptacle 170 within the slot 120 at a particular height.

For example, the chassis 102 can define: a first set of notches arranged at a first height within the central receptacle and including a first notch arranged on a first side of the slot 120 and a second notch arranged on a second side of the slot 120 opposite the first side; and a second set of notches arranged at a second height—exceeding the first height—within the central receptacle and including a third notch arranged on the first side of the slot 120, above the first notch, and a fourth notch arranged on the second side of the slot 120 above the second notch.

Therefore, by enabling an operator to reposition the height of the filter receptacle 170, the system 100 can accommodate collection vessels 180 of different heights while maintaining a constant distance between a tip or apex of a filter (e.g., a conical filter) loaded in the filter receptacle 170 and an inlet of a collection vessel 180 arranged beneath the filter receptacle 170 within the cavity.

6. Collection Vessel

The system 100 can include a collection vessel 180 transiently arranged within the slot 120, below the filter receptacle 170, and configured to collect and retain resin release from an outlet 192 of the filter 190 arranged within the filter receptacle 170. In particular, the collection vessel 180 can: define a vessel inlet 180; and be configured to transiently seat within the slot 120—on the base 124—below the filter receptacle 170, such that the vessel inlet is coaxial an outlet 192 of the filter 190 arranged within the filter receptacle 170.

In one implementation, the system 100 can include a set of collection vessels 180 of various sizes (e.g., heights, widths, volumes) configured to install within the slot 120 below the filter receptacle 170. For example, the system 100 can include: a first collection vessel 180 of a first height; and a second collection vessel 180 of a second height exceeding the first height. In this example, at a first time, a user may: install the filter receptacle 170—loaded with a first filter 190—within the slot 120 by engaging the set of inserts 174 with a first subset of retention features 122 within the slot 120, such that a first filter outlet 192 of the first filter 190 seats at a third height (e.g., relative the base 110) exceeding and within a threshold height of the first height of the first collection vessel 180; and locate the first collection vessel 180 on the base 110, below the filter receptacle 170, such that a first inlet 182 of the first collection vessel 180 seats coaxial and within the threshold distance of the first filter outlet 192. Later, at a second time succeeding the first time, the user may: install the filter receptacle 170—loaded with a second filter 190—within the slot 120 by engaging the set of inserts 174 with a second subset of retention features 122 above the first subset of retention features 122 within the slot 120, such that a second filter outlet 192 of the second filter 190 seats at a fourth height (e.g., relative the base 110) exceeding and within the threshold height of the second height of the second collection vessel 180; and locate the second collection vessel 180 on the base 110, below the filter receptacle 170, such that a second inlet 182 of the second collection vessel 180 seats coaxial and within the threshold distance of the second filter outlet 192.

In one variation, the system 100 can be configured to accommodate a collection vessel 180 exhibiting a size (e.g., height, width, cross-section) exceeding a size of the slot 120. In particular, in this variation, the chassis 102 can be configured to: receive and retain the filter receptacle 170 within the slot 120 and mount over the collection vessel 180, such that the vessel inlet 182 is coaxial and within a threshold distance of the filter outlet 192. Therefore, in this variation, the chassis 102 can omit the base 110 and rather include a set of mounting feet—extending from the lower rim of the body 110—configured to: mount the body 110 to a surface (e.g., a ground surface); and seat the slot 120—transiently loaded with the filter receptacle 170—over the collection vessel 180 (e.g., arranged on the surface). For example, the set of mounting feet can be configured to lift and support the body 110 above the surface (e.g., a ground surface) to accommodate first collection vessels 180 of various heights. Further, the set of mounting feet—extending from the lower rim of the body 110—can define a greater width or clearance than the slot 120, such that walls of the collection vessel 180 can seat below the set of mounting sections 112 and/or the lower rim of the body 110 while maintaining the vessel inlet 182 coaxial the filter outlet 192.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

The invention claimed is:

1. A system comprising:
a chassis:
   defining an upper rim and a recess arranged below the upper rim;
   comprising a set of platform mounts arranged coaxially at the upper rim and defining a pivot axis defining a fixed pivot location arranged between the set of platform mounts; and
   defining a slot arranged between the set of platform mounts, extending below the fixed pivot location, and configured to transiently receive and retain a filter receptacle within the slot below the fixed pivot location; and
an upper assembly flexibly coupled to the chassis and comprising:
   a platform:
      pivotably coupled to the chassis at the set of platform mounts;
      defining a tray-receiving section configured to transiently receive a tray configured to retain a volume of resin and defining a fluid release point;
      defining a set of tray positioners arranged about the tray-receiving section and configured to locate the fluid release point at the fixed pivot location; and
      configured to transiently mate with the upper rim in a retracted position and deploy outward from the upper rim, to locate the tray in a range of orientations and direct resin from within an interior volume of the tray toward the fluid release point for release into a filter arranged within the filter receptacle, in a deployed position;

a handle coupled to the platform and configured to pivot the platform about the pivot axis responsive to rotation; and a tray lock coupled to the platform below the tray-receiving section and comprising:

a lock body defining an inner surface and comprising a set of magnetic features operable in an engaged position and a disengaged position; and a lock control coupled to the lock body, defining a boss configured to transiently seat within the recess to constrain rotation of the platform in the retracted position, and configured to:

drive the set of magnetic features into the engaged position to constrain the tray against the platform and draw the boss outward from the recess responsive to rotation in a first direction; and drive the set of magnetic features into the disengaged position to release the tray from the platform and locate the boss within the recess to fix the orientation of the upper assembly in the retracted position responsive to rotation in a second direction opposite the first direction.

2. The system of claim 1, wherein the tray lock is configured to cooperate with the set of tray positioners to kinematically locate the tray on the tray-receiving section and constrain the fluid release point to the fixed pivot location.

3. The system of claim 2:

wherein the set of positioners comprises:

a first positioner arranged on a first side of the tray-receiving section and configured to transiently mate with a first wall of the tray seated on the tray-receiving section; and a second positioner arranged on a second side of the tray-receiving section and configured to transiently mate with a second wall of the tray seated on the tray-receiving section;

wherein the tray lock is coupled to the platform, below the tray-receiving section, at a lock location coaxial a corner of the tray, seated on the tray-receiving section, opposite the first wall and the second wall; and wherein the first positioner, the second positioner, and the tray lock cooperate to kinematically locate and constrain the fluid release point to the fixed pivot location.

4. The system of claim 1:

wherein the chassis defines:

a base defining a base section and an extended section extending from the base section; and a body mounted to the base section, defining the upper rim, and comprising the set of platform mounts; and wherein the extended section is configured to counterbalance a weight of the upper assembly in the deployed position.

5. The system of claim 1:

wherein the tray-receiving section is configured to:

transiently receive the tray during a first time period, the tray:

defining a first length, a first width, and a fixed height between a bottom surface of the tray and a rim of the tray; and defining the fluid release point arranged on a rim of the tray; and transiently receive a second tray, in replacement of the first tray, during a second time period, the second tray:

defining a second length, a second width, and the fixed height between a bottom surface of the second tray and a rim of the second tray; and defining a second fluid release point arranged on the rim of the second tray; and wherein the tray lock and the set of tray positioners are configured to cooperate to:

locate and constrain the fluid release point to the fixed location during the first time period; and locate and constrain the second fluid release point to the fixed location during the second time period.

6. The system of claim 1:

wherein the chassis defines a base and a body mounted to the base, defining the upper rim, comprising the set of platform mounts, defining the slot, and defining an inner cavity bounded by the base, the body, and the slot;

wherein the tray comprises:

a tray body defining:

a bottom surface defining an aperture of a first size; and a set of tray walls extending from the bottom surface to form the interior volume; and a membrane film arranged across the aperture; and wherein the tray-receiving section of the platform defines a window:

defining a second size corresponding to the first size of the membrane film; and configured to enable cleaning of the membrane film via the slot and the inner cavity.

7. The system of claim 1:

wherein the chassis defines a set of retention features arranged within the slot; and wherein the filter receptacle is configured to:

transiently couple to a first subset of retention features, in the set of retention features, to install within the slot at a first position defining a first height; and transiently couple to a second subset of retention features, in the set of retention features, to install within the slot at a second position defining a second height less than the first height.

8. The system of claim 7:

wherein the filter receptacle is configured to receive and retain the filter configured to release filtered resin into:

a first collection vessel arranged below the filter receptacle within the slot and defining a first vessel height during a first time period; and a second collection vessel arranged below the filter receptacle, in replacement of the first collection vessel, within the slot and defining a second vessel height less than the first vessel height during a second time period; and wherein the filter receptacle is configured to:

couple to the first subset of retention features during the first time period; and couple to the second subset of retention features during the second time period.

9. The system of claim 1, wherein the filter receptacle defines:

an upper section defining a clearance height between the platform in the retracted position and the upper surface;

a lower section configured to seat above a collection vessel arranged within the slot below the filter receptacle; and a gap:

extending through the upper section and the lower section; and configured to receive a portion of the filter during installation within the filter receptacle and removal from the filter receptacle.

10. The system of claim 1:
wherein the chassis comprises:
   a base configured to mount the chassis to a surface and comprising a unit of flat sheet metal; and
   a body mounted to the base, comprising a first unit of folded sheet metal, and defining the upper rim; and
wherein the tray platform comprises a second unit of folded sheet metal, configured to seat over the upper rim of the body.

11. The system of claim 1:
wherein the upper rim defines:
   a seat section defining a first height; a
   a set of mounting sections comprising the set of platform mounts and defining a second height, exceeding the first height, and defining a height difference between the second height and the first height; and
wherein the platform defines the tray-receiving section:
   arranged at approximately the first height in the retracted position; and
   configured to receive the tray defining:
      a base surface configured to seat against the tray-receiving section;
      a tray rim defining the fluid release point; and
      a fixed tray height, extending between the base surface and the tray rim, falling within a threshold deviation of the height difference.

12. A system comprising:
a chassis comprising a base and a body, mounted to the base, defining:
   an inner cavity and an upper rim arranged about the inner cavity;
   a set of platform mounts arranged coaxially at the upper rim and defining a pivot axis defining a fixed pivot location arranged between the set of platform mounts; and
   a slot arranged between the set of platform mounts, extending below the fixed pivot location, contiguous the inner cavity, and comprising a set of retention features;
a filter receptacle defining a central axis and configured to:
   transiently mate with the set of retention features to seat within the slot below the fixed pivot location; and
   transiently receive and retain a filter configured to filter and release resin into a collection vessel arranged below the filter receptacle within the slot; and
an upper assembly flexibly coupled to the chassis and comprising:
   a platform:
      pivotably coupled to the chassis at the set of platform mounts;
      defining a tray-receiving section and a set of tray positioners arranged about the tray-receiving section; and
      configured to transiently mate with the upper rim in a retracted position and deploy outward from the upper rim, away from the inner cavity, into a range of orientations in a deployed position;
   a tray defining a fluid release point and configured to:
      transiently seat on the tray-receiving section and cooperate with the set of tray supports to locate the fluid release point at the fixed pivot location; and
      retain a volume of resin within an interior volume of the tray in the retracted position and direct fluid from the interior volume of the tray toward the fluid release point for release from the tray, at the fluid release point, toward the resin filter in the deployed position;
   a tray lock coupled to a lower surface of the platform, opposite the tray-receiving section, and configured to transiently generate a magnetic field to draw the tray against the tray-receiving section and cooperate with the set of tray positioners to constrain the fluid release point at the fixed pivot location across the range of orientations; and
   a handle coupled to the platform and configured to pivot the platform about the pivot axis, and pivot the tray about the fluid release point, responsive to rotation.

13. The system of claim 12, wherein the filter receptacle:
defines an upper surface defining a clearance height between the upper assembly in the retracted position and the upper surface; and
defines a gap:
   arranged on a side of the filter receptacle opposite the inner cavity; and
   configured to receive a portion of the filter during installation within the filter receptacle and removal from the filter receptacle, the filter defining a filter height exceeding the clearance height.

14. The system of claim 12:
wherein the chassis defines a set of retention features arranged within the slot; and
wherein the filter receptacle is configured to:
   transiently couple to a first subset of retention features, in the set of retention features, to install within the slot at a first position defining a first height; and
   transiently couple to a second subset of retention features, in the set of retention features, to install within the slot at a second position defining a second height less than the first height.

15. The system of claim 14:
wherein the filter receptacle is configured to receive and retain the filter configured to release filtered resin into:
   the collection vessel arranged below the filter receptacle within the slot and defining a first vessel height during a first time period; and
   a second collection vessel arranged below the filter receptacle, in replacement of the collection vessel, within the slot and defining a second vessel height less than the first height during a second time period; and
wherein the filter receptacle is configured to:
   couple to the first subset of retention features during the first time period; and
   couple to the second subset of retention features during the second time period.

16. The system of claim 12:
wherein the tray comprises a rectangular tray defining:
   a first length;
   a first width; and
   a fixed height between a bottom surface of the rectangular tray and an upper rim of the rectangular tray; and
wherein the fluid release point is arranged on the upper rim of the rectangular tray.

17. The system of claim 16:
wherein the tray-receiving section is configured to transiently receive a set of trays comprising the rectangular tray and a second rectangular tray:

defining a second length, a second width, and the fixed height between a bottom surface of the second rectangular tray and an upper rim of the second rectangular tray;

defining a second fluid release point arranged on the upper rim of the second rectangular tray; and configured to:
cooperate with the set of tray positioners to locate the second fluid release point in the fixed location arranged along the pivot axis and within the threshold distance of the central axis;
receive and retain a volume of resin within an interior volume of the second rectangular tray in the retracted position; and
direct fluid in the interior volume of the second rectangular tray toward the fluid release point, for release into a filter arranged within the filter receptacle, in the deployed position.

18. The system of claim 17:
wherein the tray-receiving section of the platform is configured to receive the rectangular tray during a first time period;
wherein the filter receptacle is configured to receive and locate a first filter in the filter receptacle during the first time period for filtering of resin collected from the rectangular tray;
wherein the tray-receiving section of the platform is configured to receive the second rectangular tray during a second time period distinct from the first time period; and
wherein the filter receptacle is configured to receive and locate a second filter in the filter receptacle during the second time period for filtering of resin collected from the second rectangular tray.

19. A system comprising:
a chassis defining:
an upper rim;
a set of platform mounts arranged coaxially at the upper rim and defining a pivot axis defining a fixed pivot location arranged between the set of platform mounts; and
a slot arranged between the set of platform mounts, extending below the fixed pivot location, and configured to transiently receive and retain a filter receptacle below the fixed pivot location within the slot, the filter receptacle configured to receive a filter for filtering and releasing resin into a collection vessel transiently arranged below the filter receptacle within the slot; and
an upper assembly flexibly coupled to the chassis and comprising:
a tray platform:
pivotably coupled to the chassis at the set of platform mounts;
defining a tray-receiving section configured to transiently receive a tray defining a fluid release point and configured to retain a volume of resin and defining a fluid release point;
defining a set of tray supports arranged about the tray-receiving section and configured to locate the fluid release point at the fixed pivot location; and
configured to transiently mate with the upper rim in a retracted position and deploy outward from the upper rim, away from the inner cavity, in a deployed position to locate the tray in a range of orientations and direct resin from an interior volume of the tray toward the fluid release point for release into the filter;
a handle coupled to the platform and configured to pivot the platform about the pivot axis, to pivot the tray about the fluid release point and locate the tray in a target orientation, responsive to rotation in a first direction; and
a tray lock coupled to the platform and configured to transiently generate a magnetic field to draw a bottom surface of the tray against the tray-receiving section and cooperate with the set of tray supports to constrain the fluid release point to the fixed pivot location in the deployed position.

20. The system of claim 19:
wherein the chassis defines a recess arranged proximal the upper rim; and
wherein the tray lock comprises:
a set of magnetic features:
operable in an engaged position and a disengaged position; and
configured to:
transiently generate a magnetic field to draw the tray against the tray-receiving section in the engaged position; and
withhold generation of the magnetic field in the disengaged position; and
a lock control:
coupled to the set of magnetic features;
defining a boss configured to seat within the recess to transiently constrain rotation of the upper assembly in the retracted position; and
configured to:
drive the set of magnetic features into the engaged position to constrain the tray against the platform and draw the boss outward from the recess to unfix an orientation of the upper assembly relative the chassis responsive to rotation in a first direction; and
drive the set of magnetic features into the disengaged position to release the tray from the platform and locate the boss within the recess to fix the orientation of the upper assembly responsive to rotation in a second direction opposite the first direction.

* * * * *